United States Patent Office 3,618,321
Patented Nov. 9, 1971

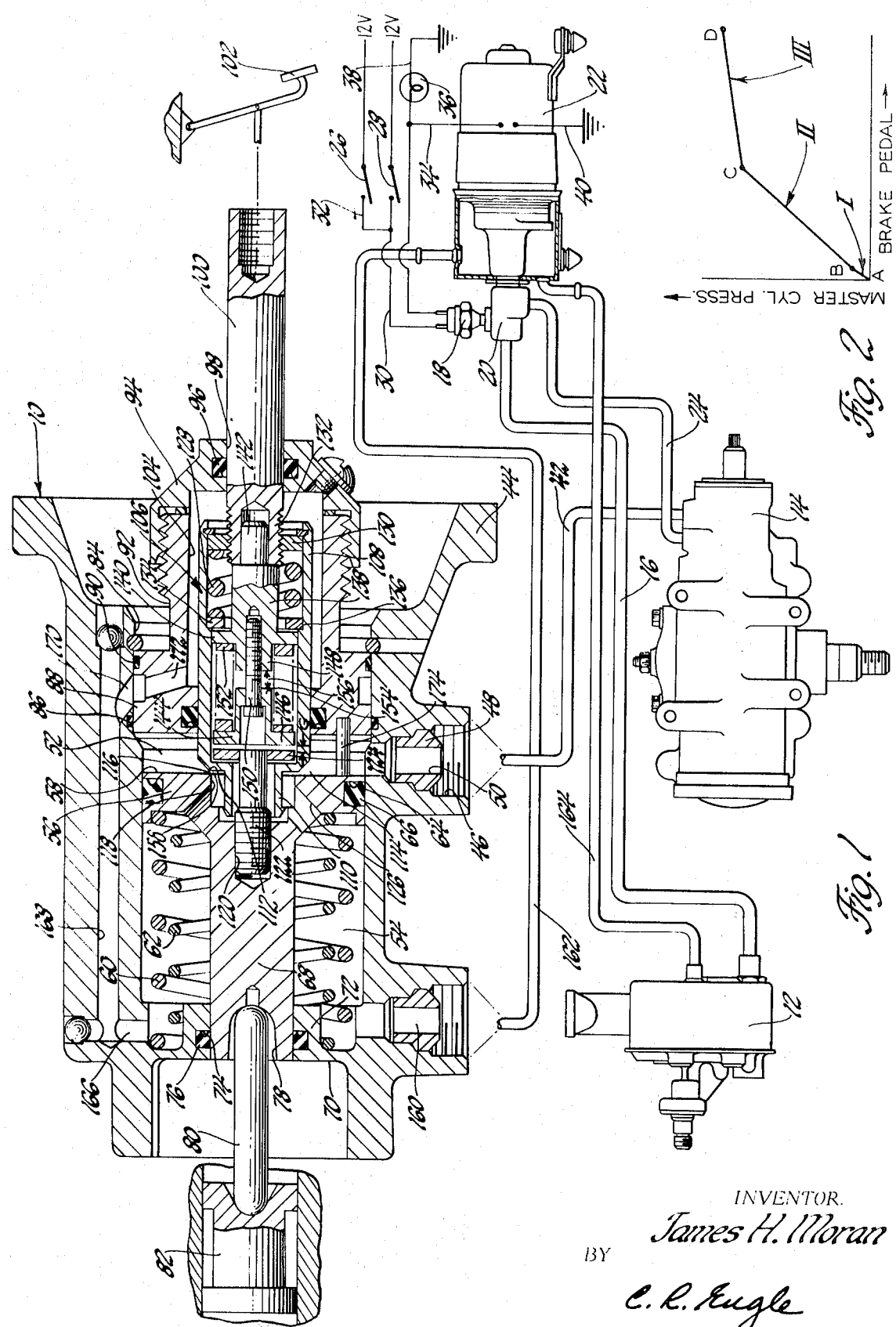

3,618,321
HYDRAULIC BRAKE BOOSTER ASSEMBLY
James H. Moran, Grand Blanc, Mich., assignor to
General Motors Corporation, Detroit, Mich.
Filed July 15, 1970, Ser. No. 54,929
Int. Cl. F15b 7/00
U.S. Cl. 60—54.6                                  3 Claims

ABSTRACT OF THE DISCLOSURE

An open center type hydraulic brake booster providing three distinct brake apply effort versus master cylinder pressure relationships while applying the brakes. A valve member cooperates with a power piston forming a flow restrictor between the open center oil pressure chamber and a return passage through the piston, all within a booster housing. The valve is mounted for actuation by the push rod against the force of a biasing spring. Initial brake applying movement of the pedal push rod moves the valve to further restrict flow of pressure through the return passage developing an apply pressure upon the working face of the power piston moving the master cylinder push rod providing the first apply effort-master cylinder pressure relationship. Continued movement of the pedal push rod engages a spring biased rod pad with a protrusion on the power piston and a parallel force transference occurs, this being the second brake effort-apply pressure relation. A portion of the force on the master cylinder push rod is applied by the fluid pressure on the power piston and a portion is mechanically applied through the pedal push rod and the pad biasing spring to the piston. Upon further movement, the pedal push rod sufficiently compresses the biasing spring engaging the pad and the push rod completing a direct mechanical connection to the power piston. This establishes the third brake effort-apply pressure relationship. The rod pad is secured by an adjusting screw providing for establishing the second relationship as desired. Also the hydraulic booster housing contains a passage connecting the return side of the power piston with a rod end of the valve. The pressure and rod ends of the valve have substantially equal areas cancelling the effect of pressure pulses received in the open center pressure chamber.

This invention relates to a vehicle hydraulic brake booster assembly used in a common hydraulic system with power steering components and more particularly to a brake booster incorporating means providing three brake apply effort-master cylinder ouput pressure relationships along with an adjustable pressure relief.

Heretofore in the vehicle art it has been common practice to utilize an open center hydraulic booster connected in a common hydraulic system with the power steering pump, the pump supplying fluid pressure actuating the brake master cylinder push rod. One difficulty with an arrangement of this type is the occurrence of pressure pulses developed by the power steering pump. These pulses, transmitted through the brake push rod, generate an objectionable pedal kick sensed by the operator while the power steering and brake systems are being simultaneously actuated. Therefore the purposes of this invention include the provision of means to cancel power steering pump pressure pulses prior to their transmittal to the brake pedal, means to change the slope of the brake applying fluid pressure versus brake pedal effort curves at predetermined efforts, and means providing a pressure relief clearance limiting the pressure buildup in the booster open center pressure chamber.

Among the objects of this invention is the provision of an open center hydraulic brake booster assembly containing passages directing pressure fluid to opposing ends of a valve cancelling line pressure pulses before they are sensed as pedal kick by the vehicle operator.

Another object of this invention is the provision of a modulating spring biasing a restrictor valve with specific force providing predetermined pedal effort-apply pressure characteristics.

A further object of this invention is the provision of a spring biased member secured to the end of the brake pedal push rod adjustably spaced from a valve gap adjusting screw which, upon engagement with the adjusting screw, mechanically transmits a portion of pedal apply force directly to the power piston and simultaneously the valve is maintained in position to apply fluid pressure to the power piston, this condition providing an effort pressure curve of less slope than that produced by the valve modulating spring.

Still another object of the present invention is incorporation of a pressure relief clearance between the pedal push rod and the spring biased pad, closure of which completes a mechanical connection between the push rod and the power piston preventing further buildup of pressure in the open center fluid chamber.

In the drawings:

FIG. 1 is a sectional view of the brake booster assembly shown connected in a vehicle hydraulic power steering system.

FIG. 2 is a graph illustrating the three brake pedal effort-master cylinder pressure slopes occurring during application of the brakes.

Referring now to FIG. 1, a hydraulic brake booster assembly 10 of the subject invention is shown connected in a vehicle power steering oil circuit including a power steering pump 12 supplying pressurized oil to a power steering gear 14 through a line 16 to a pressure switch 18 secured to transfer valve 20 that in turn is connected to an electro-hydraulic reserve pump 22. The pressurized oil passes through switch 18 and enters the steering gear 14 via line 24. Pressure switch 18 has one terminal connected in circuitry with brake switch 26 and ignition switch 28 through electrical leads 30 and 32 while the other terminal is in circuitry with the electro-hydraulic reserve pump 22 by lead 34. A warning light 36 is connected in circuit with lead 34 to ground by an electrical lead 38. A second lead 40 connects the reserve pump circuit to ground. Should pressure switch 18 sense a pressure failure, reserve pump 22 is energized supplying pressurized oil in the event the pump 12 is no longer driven by the vehicle engine.

The hydraulic brake booster assembly 10 receives pressurized oil from the power steering gear 14 through conduit 42 which is connected to brake booster housing 44 at pressure inlet port 46. The inlet port 46 contains a press-fit bushing 48 defining an orifice 50 metering inlet flow into open center pressure chamber 52. Housing 44 contains an oil return chamber 54 slidably receiving a power piston 56 having a face 58 forming one wall of the pressure chamber 52. The power piston 56 is biased toward chamber 52 by springs 60 and 62. A circumferential groove 64 in piston 56 receives a sealing ring 66 providing a fluid seal between pressure chamber 52 and return chamber 54. The piston 56 also comprises an integral stem 68 slidably supported within a web section 70 of housing 44. The web 70 includes an axially extending flange 72 containing a groove 74 receiving sealing ring 76. An arcuate recess 78 receiving one end of master cylinder push rod 80 is provided in the end of stem 68. The other end of the push rod 80 engages master cylinder piston 82. Cylindrical chamber 54 terminates in an enlarged bore 84 containing a sealing ring 86. A closure 88 sealingly engages the bore 84 by virtue of ring 86 and a closure mounted ring 90. The closure 88 comprises a reduced diametrical portion 92 threadably receiving a cap member 94 containing a seal 96 in aperture 98 slidably supporting brake pedal push rod 100. Push rod 100 is connected to brake actuating pedal 102. Closure 88 and cap 94 define a valve chamber 104.

A valve 106, in the form of a sleeve 108 comprising a reduced end 110, is reciprocally movable in chamber 104. The sleeve 108 has a valve surface 112 adjacent a reaction area 114, movable toward a valve seat 116 on piston face 58. A counterbore 118 in piston 56 receives sleeve end 110 and is threaded at 120 receiving a valve gap adjusting screw 122 providing an abutment 124. A passage 126 connects counterbore 118 with oil return chamber 54. The valve 106 is concentrically positioned upon push rod 100 and is biased toward valve seat 116 by a modulating spring 128 engaging a stop 130 threaded on the rod 100 at 132 and a washer 134 in contact with a valve shoulder 136. Push rod 100 has an extension 138 including an annular flange 140, the extension 138 being threaded in end 142. A pad member 144 having an annular flange 146 is mounted and cushioned on end 148 of extension 138 by a screw 150 which adjusts the compression of spring 152 against the annular flanges 140 and 146 for a purpose later described. The pad 144 also includes body section 154 spaced from rod extension 138 defining a pressure relief clearance 156 therebetween.

As previously mentioned, housing 44 contains inlet port 46 supplying pressurized oil to pressure chamber 52 from which the oil normally flows through a restrictor passage 158 between valve seat 116 and valve surface 112 through passage 126 to return chamber 54. A return port 160 connects the chamber 54 with conduit 162 directing the oil to transfer valve 20 from which it is returned to pump 12 by conduit 164. Return chamber also is in fluid connection with a drilled passage 166 supplying return oil to an axially extending passage 168 connecting with passage 170 directing oil to valve chamber 104 through passage 172 in closure 88. The closure 88 has at least three stop pins 174, press-fit therein, for positioning power piston 56 relative to closure 88 and valve 106 when the booster 10 is in a static condition.

In operation, initial movement of brake pedal 102 moves push rod 100, extension 138, stop 130, and pad 144 relative to valve 106. Spring 128 is compressed against washer 134, engaging valve shoulder 136, applying an initial force against valve 106. This results in an increase in pressure in open center pressure chamber 52 as the valve 106 moves to reduce the restrictor passage 158. The power piston moves in response to the pressure in chamber 52 actuating master cylinder piston 82 providing the relationship A–B on the pressure-effort curve shown in FIG. 2.

Valve gap adjusting screw 122 is adjustably positioned in threaded counterbore 120 regulating the distance G between abutment 124 and the cushioned pad 144. Further movement of push rod 100 engages pad 144 with abutment 124 at which time a parallel force transference takes place. A portion of the force supplied to master cylinder piston 82 by power piston 56 results from the pressurized oil in open center chamber 52 against piston face 58 while the balance of the force to piston 82 is provided through spring 152 from push rod 100 to abutment 124 rigidly secured to power piston 56 by valve gap adjusting screw 122. This is the second inherent pressure-effort relationship of the subject brake booster assembly illustrated as B–C on the curve shown in FIG. 2.

Continued depression of brake pedal 102 moves rod 100 sufficiently to compress valve modulating spring 128 and cushioning spring 152 to the extent that the pressure relief clearance 156 between rod extension 138 and pad 144 is closed. End 148 of rod extension 138 contacts the body section 154 of pad 144 completing a direct mechanical connection between pedal 102 and master cylinder piston 82. This eliminates any further buildup of pressure in open center chamber 52 as no further assist pressure can be generated due to the restriction between valve surface 112 and seat 116. The reason that the restriction is ineffective is that the valve 106 moves with the power piston 56 to increase the volume of chamber 52 such as to eliminate the effect of the supplied pressure fluid. The closing of the pressure relief clearance 156 creates the third inherent relationship C–D of the subject brake booster assembly shown by the grap in FIG. 2. It is apparent the master cylinder pressure continues to increase during this phase as a force is being applied as long as the pedal is being actuated.

It is significant that the restriction 158 between valve surface 112 and valve seat 116 is never completely closed. When the brakes are not being applied springs 60 and 62 position power piston 56 against stop pins 174 in closure 88 and the restriction is at a maximum opening. Closing movement of valve 106 toward valve seat 116 is limited by the closing of the pressure relief clearance 156 whereupon the valve and the power piston 56 move as a unit. By virtue of maintaining a restrictor space it is possible to eliminate pedal kick in the brake system and yet take advantage of pressurized oil in the power steering system. Any pressure pulse developed by the power steering pump 12 and gear 14 in the hydraulic system is rapidly transmitted to the booster open center chamber 52 as it travels at a speed equal to the speed of sound in the medium. The pulse rapidly passes through the restriction 158; return chamber 54; and passages 166, 168, 170 and 172 to valve chamber 104. Since the pressure pulse is present in open center chamber 52 and valve chamber 104 almost simultaneously, the pulse remains in the brake booster for approximately .002 second, and valve 106 presents substantially equal areas, including reaction area 114, in each chamber, the pulse is cancelled prior to being sensed at pedal 102.

From the above description, it is apparent the booster assembly 10 provides means for cancelling any pressure pulses developed in the power steering oil system prior to receipt thereof against the brake pedal. Further, this system incorporates the three effort-pressure relationships illustrated in FIG. 2 which may be adjusted for particular vehicle applications by valve gap adjusting screw 122 and pad adjusting screw 150. Adjustment of these screws determines points B and C on the curve shown in FIG. 2.

A preferred embodiment of the invention has been described for purposes of illustration only and the scope of the invention is not intended to be limited except as defined by the following appended claims.

What is claimed is:

1. In an open center hydraulic brake booster assembly including a housing, a power piston reciprocally mounted in said housing, a pair of springs biasing said piston to a static position, a master cylinder push rod engaged by said piston, a closure member enclosing one end of said housing and defining a valve chamber therein, a cap member secured to said closure member, a brake pedal push rod slidably received in said cap member, a brake pedal connected to one end of said push rod, a sleeve valve slidably mounted within said valve chamber, a stop member threaded on the other end of said brake pedal push rod and being concentrically disposed within said sleeve valve, a shoulder formed in the inner surface of said sleeve valve, a washer positioned against said shoulder, a valve modulating spring engaging said washer and said stop member, an extension including a circumferential flange in sliding engagement with the sleeve valve inner surface secured to the other end of said push rod, a pad member including a circumferential flange, an adjusting screw loosely securing said pad member to said push rod extension, a cushioning spring engaging said rod extension and said pad member flanges biasing said pad away from said rod extension against the adjusting screw and thereby defining a pressure relief clearance between said pad and said extension, said power piston containing a centrally positioned counterbore receiving a portion of said sleeve valve, a valve gap adjusting screw threadably positioned in the innermost portion of said counterbore, an abutment integral with said adjusting screw and positioned thereby determining the valve gap between the abutment and said pad, a valve seat on said power piston at the outer perimeter of said counterbore, said sleeve valve having a surface cooperating with said seat forming a restricted fluid passage therebetween regulating flow into the counterbore around said valve, initial brake apply movement of said push rod compressing said modulating spring moving said valve toward said valve seat causing a fluid pressuer buildup against said piston generating a first inherent brake pedal effort-master cylinder pressure relationship, further push rod movement engaging said cushioned pad with said valve gap adjusting screw abutment applying limited mechanical force to said piston through said cushioning spring which in conjunction with fluid pressure on the piston generates a second inherent effort-pressure relationship, continued movement of the push rod closing said pressure relief clearance eliminating any further increase in fluid pressure on said piston and completing a direct mechanical connection between the brake pedal and the master cylinder generating a third inherent effort-pressure relationship, a fluid return chamber in said housing on the rod side of said piston, said piston containing a passage connecting said counterbore with the return chamber, said housing containing a return port connecting with said return chamber, said housing also containing passages connecting said return chamber with said valve chamber, said housing further containing an inlet port connecting with an open center pressure chamber defined by said piston and said closure member, said valve presenting substantially equal areas in said open center chamber and said valve chamber whereby fluid pressure pulses received almost simultaneously against opposite ends of said valve in these chambers received through said passage connected thereto are cancelled, and a plurality of stop pins in said closure member engaging and positioning said piston when said piston assembly is in a static condition.

2. In an open center hydraulic brake booster assembly including a housing, a power piston slidably mounted within said housing defining an open center pressure chamber on one side thereof and a return chamber on the other side thereof, a valve member, a brake pedal push rod, a spring providing a resilient connection between said push rod and said valve whereby initial movement of said push rod moves said valve toward said piston restricting flow therebetween, said power piston containing a fluid return passage, an adjustable valve gap screw secured to said piston and presenting an abutment member, the initial movement of said push rod moving said valve toward said return passage restricting flow therethrough causing a pressure buildup on the face of said power piston and creating a first inherent brake pedal effort-master cylinder pressure relationship, a cushioned member mounted on the end of said push rod, a cushioning spring biasing said member away from the end of said push rod, further movement of said push rod engaging said cushioned member with said adjusting screw abutment whereby said power piston is actuated mechanically through said cushioned member and said push rod as well as by the pressure fluid applied to the piston face thereby creating a second inherent effort-pressure relationship, continued movement of said push rod engaging said cushioned member with said push rod end thereby creating a direct mechanical connection between said push rod and said master cylinder piston eliminating any further increase of fluid pressure against said piston whereby a third inherent effort-pressure relationship is created, said housing containing a valve chamber slidably receiving said valve member, said housing containing passages connecting said return chamber with said valve chamber, said valve being movable toward said piston but never completely engaging the surfaces thereof whereby a restrictor passage is always sufficiently open to allow flow of pressure fluid from said open center chamber to said return chamber, said valve presenting equal areas in said open chamber and said valve chamber whereby any pressure pulse received in the fluid system is almost simultaneously sensed by opposite ends of the valve in the open center chamber and said valve chamber via the passages in said housing thereby cancelling said pulses before sensing thereof through the push rod to the brake pedal.

3. In an open center hydraulic brake booster assembly as described in claim 2 wherein said cushioned member is adjustably mounted on the end of said push rod providing for adjustment of the second inherent effort-pressure relationship in said system, and said valve comprising a sleeve valve concentrically disposed upon said push rod and being biased toward said power piston by said spring having a predetermined modulating spring force providing a specified first inherent brake pedal effort-master cylinder pressure relationship.

References Cited
UNITED STATES PATENTS

| | | | |
|---|---|---|---|
| 3,148,592 | 9/1964 | Schultz et al. | 60—54.6 P |
| 2,957,454 | 10/1960 | Stelzer | 60—54.6 P |
| 3,283,505 | 11/1966 | Julow et al. | 60—54.5 P |

EDGAR W. GEOGHEGAN, Primary Examiner

A. M. ZUPCIC, Assistant Examiner